(12) United States Patent
Urlass

(10) Patent No.: US 6,731,021 B1
(45) Date of Patent: May 4, 2004

(54) TWO-BATTERY SYSTEM

(75) Inventor: Thorsten Urlass, Tuelau (DE)

(73) Assignee: Volkswagen AG, Wolfsburg (DE)

( * ) Notice: Subject to any disclaimer, the term of this patent is extended or adjusted under 35 U.S.C. 154(b) by 44 days.

(21) Appl. No.: 10/130,890

(22) PCT Filed: Nov. 22, 2000

(86) PCT No.: PCT/EP00/11629
§ 371 (c)(1),
(2), (4) Date: Aug. 29, 2002

(87) PCT Pub. No.: WO01/39350
PCT Pub. Date: May 31, 2001

(30) Foreign Application Priority Data

Nov. 23, 1999 (DE) .......................... 199 57 478

(51) Int. Cl.[7] .......................... H01M 12/00; H02J 7/00; B06L 1/00
(52) U.S. Cl. ....................... 307/10.1; 320/126
(58) Field of Search ................ 307/10.1, 19, 23, 307/28, 139; 320/104, 126; 429/9

(56) References Cited

U.S. PATENT DOCUMENTS

| | | | |
|---|---|---|---|
| 3,949,289 A | | 4/1976 | Day |
| 5,977,652 A | | 11/1999 | Frey et al. |
| 6,057,666 A | * | 5/2000 | Dougherty et al. ......... 320/104 |
| 6,222,341 B1 | * | 4/2001 | Dougherty et al. ......... 320/104 |
| 6,229,279 B1 | * | 5/2001 | Dierker ...................... 320/104 |
| 6,271,642 B1 | * | 8/2001 | Dougherty et al. ......... 320/104 |
| 6,452,361 B2 | * | 9/2002 | Dougherty et al. ......... 320/104 |
| 6,597,149 B1 | * | 7/2003 | Urlass et al. ................ 320/104 |

FOREIGN PATENT DOCUMENTS

| | | |
|---|---|---|
| DE | 40 28 242 | 3/1992 |
| DE | 196 51 612 | 6/1998 |
| DE | 197 06 946 | 8/1998 |
| DE | 198 13 369 | 9/1999 |
| DE | 198 55 245 | 10/1999 |
| EP | 0 945 959 | 9/1999 |

\* cited by examiner

Primary Examiner—Gregory J. Toatley, Jr.
(74) Attorney, Agent, or Firm—Kenyon & Kenyon

(57) ABSTRACT

A two-battery system includes a starter, a generator, a starter battery, a vehicle electrical system battery, vehicle electrical system-specific consumers and consumers relevant to starting. A first electronic pole binder is arranged between the starter and the starter battery, and a second pole binder is arranged between the starter and the vehicle electrical system battery. A circuit breaker controllable by a signal that determines the excitation of the generator is arranged between the vehicle electrical system battery and the starter battery. The vehicle electrical system-specific consumers are permanently associated with the vehicle electrical system battery, and the consumers relevant to starting are permanently associated with the starter battery.

9 Claims, 1 Drawing Sheet

TWO-BATTERY SYSTEM

FIELD OF THE INVENTION

The present invention relates to a two-battery system and a method for starting and managing the charge of a two-battery system.

BACKGROUND INFORMATION

German Published Patent Application No. 40 28 242 describes a two-battery system that includes a generator, a starter, a starter battery, a vehicle electrical-system.battery, electrical consumers, and a starter-battery switch, which is connected to a control unit. In this context, electrical consumers are subdivided into primary and secondary consumers. Primary consumers are to be understood as consumers essential to the starting ability and driving ability or vehicle safety, such as the engine control unit and the lights. The secondary consumers are consumers that are primarily responsible for comfort; such as the on-board computer, seat heater, or hi-fi system. The starter-battery switch is arranged between the starter battery and the rest of the vehicle electrical system, while the starter is directly coupled to the.starter battery. The starter-battery switch is switched by the control unit as a function of the charge of the starter battery and the electrical-system battery, and the current supplied by the generator. The starter-battery switch is closed by the control unit during the trip, i.e., when the engine is running, when the generator is supplying current, in order to charge both batteries and simultaneously power the consumers, or when charge equalization occurs to the advantage of the starter battery. The starter-battery switch is always opened when the engine is standing. This prevents the starter battery from being discharged by the closed-circuit current of the consumers or by a discharged electrical-system battery, while standing or driving. A disadvantage of the conventional two-battery system is that the connection between the starter and the starter battery is permanently in-circuit, thereby requiring appropriate, costly protective measures. If, however, the starter lead is switched off-circuit, then the conventional methods for starting and managing the charge of a two-battery system may not be applied.

Therefore, it is an object of the present invention to provide a method for starting and managing the charge of a two-battery system having a fused starter lead, and a two-battery system for implementing the method.

SUMMARY

The above and other beneficial objects of the present invention are achieved by providing a method and a system as described herein.

With the exception of the actual starting phase, the control line may be switched off circuit by positioning the electronic pole terminals between the starter battery and the starter, and between the electrical-system battery and the starter. In this case, the start-relevant consumers are permanently assigned to the starter battery, and the electrical-system consumers are permanently assigned to the electrical-system battery. A circuit-breaker, which may be switched by a signal determining the excitation of the generator, is arranged between the electrical-system battery and the starter battery. This allows for extremely simple starting management and charge management of a two-battery system, by which both very large engines may be reliably started and very long immobilization times are possible. In the stopped state, the starter battery may be electrically decoupled from the electrical-system battery by the open circuit-breaker and the blocked electronic pole terminals, so that the starter battery is not loaded by the electrical-system consumers, but only has to satisfy the start-relevant consumers' very small need for closed-circuit current. Since the closed-circuit currents of the start-relevant consumers are in the mA range, immobilization times of several months are possible. The start-relevant consumers do load the starter battery during vehicle operation, but the currents in the range of 10–16 A are easily compensated for by the energized generator. The electronic pole terminal is blocked again after the starting procedure, and the circuit-breaker is closed after the generator is energized. When fully energized, the generator supplies an output voltage of approximately 14.4 V. Thus, there is always a potential difference between the generator supply point and the two batteries, regardless of whether they are completely charged or discharged. This may ensure that, even when the two batteries are connected in parallel, shunt currents, which may otherwise destroy the circuit-breaker, may not flow from one battery to the other. Therefore, the circuit-breaker enables simple charge management to be realized for the starter battery, it being ensured that the current may only flow from the generator to the two batteries.

Various circuit configurations are possible, depending on the field of application. In order to start large engines that require a large starter current, the two batteries are generally connected in parallel for starting. In this context, the load on the starter battery during the starting procedure is deemed acceptable, since the starter battery is normally recharged to a sufficient extent when the generator is energized. However, in the case of smaller engines, it may be important to load the starter battery as little as possible. To this end, it is standard to only use the electrical-system battery for starting. But, if the electrical-system battery is discharged and the starter battery is charged, then the starter battery is used for starting. If, however, the starter battery is discharged, then an external start may be performed, even when the electrical-system battery is charged, since the start-relevant consumers are no longer powered.

Therefore, a further, example embodiment provides for the circuit breaker receiving a signal from an electrical-system control unit. If the electrical-system battery is charged and the starter battery discharged, then the electrical-system control unit switches the circuit breaker through, so that the electrical-system battery then takes over supplying voltage to the start-relevant consumers in the starting phase. The electrical-system battery may then be used for starting, the electronic pole terminal of the starter battery, e.g., remaining blocked, since a portion of the starter current may otherwise flow through the circuit breaker and possibly ruin it.

But if both batteries are discharged, then an external start may be performed, using an external battery. In this case, only the electronic pole terminal of the starter battery is switched through.

The present invention is explained below in detail, with reference to an example embodiment.

BRIEF DESCRIPTION OF THE DRAWING

The FIGURE is a schematic block diagram of a two-battery system according to the present invention.

DETAILED DESCRIPTION

Figure 1:
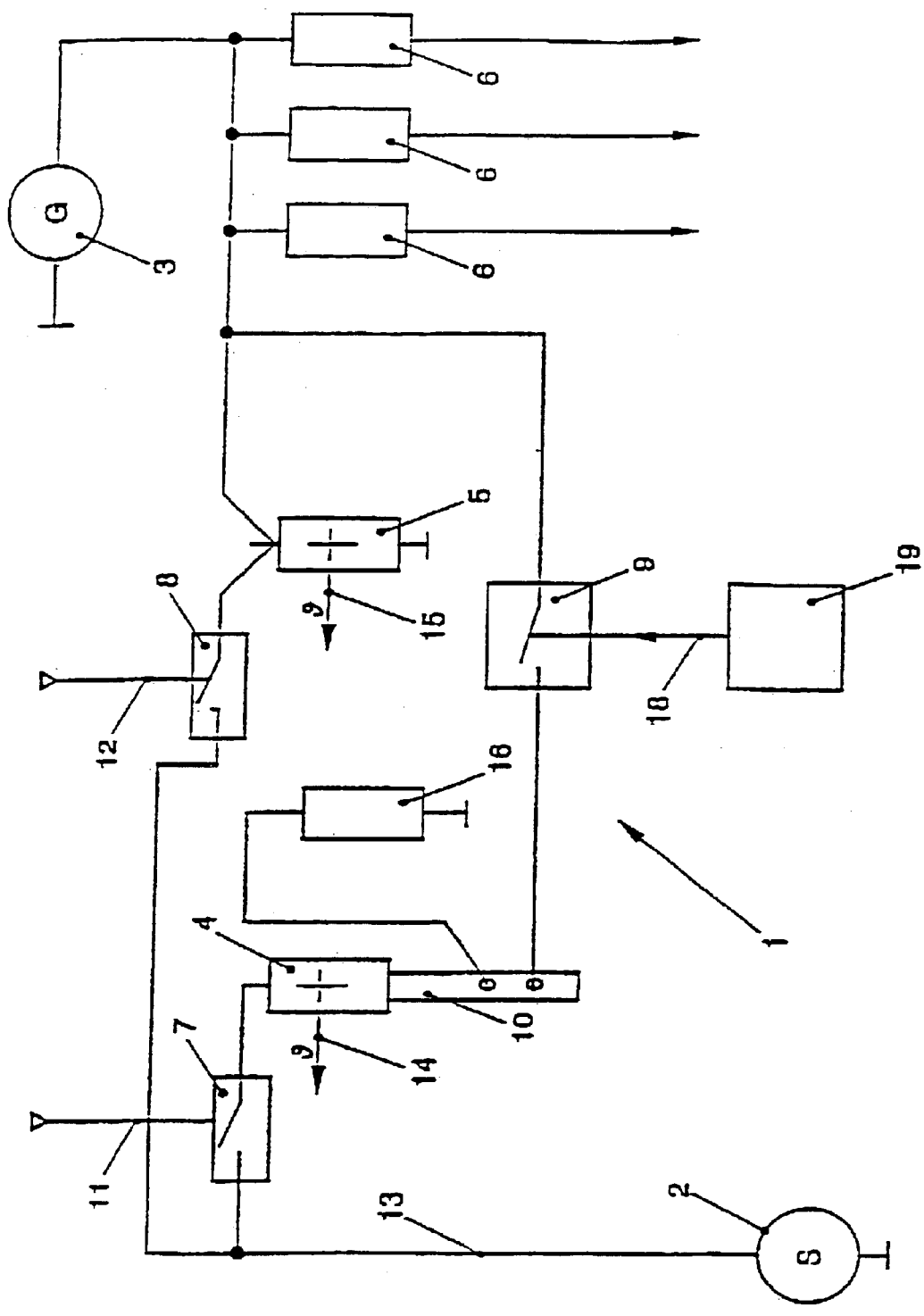

Two-battery system 1 includes a starter 2, a generator 3, a starter battery 4, an electrical-system battery 5, and consumers 6 specific to the vehicle electrical system, which are permanently connected to electrical-system battery 5. An electronic pole terminal 7 is arranged between the positive pole of starter battery 4 and starter 2. In the same manner, an electronic pole terminal 8 is arranged between the positive pole of electrical-system battery 5 and starter 2. Arranged between the positive pole of starter battery 4 and generator 3, i.e., the positive pole of electrical-system battery 5, is a circuit breaker 9, which is connected to starter battery 4 via a tap 10. Electronic pole terminal 7 is configured to have a control input 11, and electronic pole terminal 8 is configured to have a control input 12, the transmitted signals being a logical combination of a start signal from a mechanical ignition lock or a start-enabling control unit, and the state of charge of the two batteries. Arranged between starter 2 and electronic pole terminals 7, 8 is starter lead 13, which is switched off-circuit by the two pole terminals 7, 8, except in the starting phase. In addition, starter battery 4 and electrical-system battery 5 are each assigned a temperature-monitoring device 14, 15. Start-relevant consumers 16 are permanently assigned to starter battery 4. Circuit breaker 9 is connected to an electrical-system control unit 19 by a control line 18.

When the motor vehicle is standing still, electronic pole terminals 7, 8 and circuit breaker 9 are open. Start-relevant consumers 16 are permanently assigned to starter battery 4. In this context, start-relevant consumers 16 include the engine control unit, the instrument cluster, and possibly an airbag control unit. If the motor vehicle is also equipped with an electronic ignition lock, then start-relevant consumers 16 also include a start-enabling control unit. Since the configuration includes electronic pole terminal 7, start-relevant consumers 16 are connected to starter battery 4 via tap 10, which simultaneously acts as an external starting-assistance point. Due to blocked electronic pole terminals 7, 8, starter lead 13 is off-circuit, and starter battery 4 is decoupled from electrical-system battery 5 and the consumers 6 specific to the vehicle electrical system. Starter battery 4 is only loaded by the closed-circuit current of start-relevant consumers 16.

Prior to initiating the starting procedure, electrical-system control unit 19 first checks the charge of electrical-system battery 5 and starter battery 4. If this test reveals that the charge of the two batteries is sufficient, then only electric pole terminal 8 is switched through. Start-relevant consumers 16 are then powered by starter battery 4, and the starter current is exclusively supplied by electrical-system battery 5. But if electrical-system battery 5 is discharged and starter-battery 4 is charged, then only electronic pole terminal 7 is switched through, so that starter battery 4 supplies both start-relevant consumers 16 and starter 2 with voltage. If, however, electrical-system battery 5 is charged and starter battery 4 is discharged, then electrical-system control unit 19 closes circuit breaker 9. This allows electrical-system battery 5 to power start-relevant consumers 16 in the starting phase. Starter 2 is powered by electrical-system battery 5, by switching electronic pole terminal 8. But if both batteries are discharged, then an external start may be performed by an external battery that is connected to tap 10 for this purpose. Start-relevant consumers 16 are powered in this manner. Switching electronic pole terminal 7 through then enables the external battery to power starter 2.

After the starting procedure, the switched-through electronic pole terminals 7, 8 are blocked again, and starter lead 13 is consequently switched off-circuit. Electrical-system control unit 19 then determines the excitation of generator 3 and switches circuit breaker 9, if it is not yet closed. This allows starter battery 4 to be recharged by generator 3.

LIST OF REFERENCE NUMERALS 1) two-battery system
2) starter
3) generator
4) starter battery
5) electrical-system battery
6) consumers specific to the vehicle electrical system
7) pole terminal
6) pole terminal
9) circuit breaker
10) tap
11) control input
12) control input
13) starter lead
14) temperature-monitoring device
15) temperature-monitoring device
16) start-relevant consumers
18) control line
19) electrical-system control unit

What is claimed is:

1. A two-battery system, comprising:

a starter;

a generator;

a starter battery;

an electrical-system battery;

consumers specific to the vehicle electrical system;

start-relevant consumers;

a first electronic pole terminal arranged between the starter and the starter battery;

a second electronic pole terminal arranged between the starter and the electrical-system battery; and a circuit breaker controllable by a signal determining an excitation of the generator arranged between the electrical-system battery and the starter battery;

wherein the consumers specific to the vehicle electrical system are permanently assigned to the electrical-system battery, and the start-relevant consumers are permanently assigned to the starter battery.

2. The two-battery system according to claim 1, further comprising an electrical-system control unit configured to control at least one of the circuit breaker and the electronic pole terminals.

3. The two-battery system according to claim 1, wherein the start-relevant consumers include an engine control unit and an instrument cluster.

4. The two-battery system according to claim 3, wherein the start-relevant consumers include at least one of a start-enabling control unit and an airbag control unit.

5. A method for starting a motor vehicle having a two-battery system, the two battery system including:

a starter;

a generator;

a starter battery;

an electrical-system battery;

consumers specific to the vehicle electrical system;

start-relevant consumers;

a first electronic pole terminal arranged between the starter and the starter battery;

a second electronic pole terminal arranged between the starter and the electrical-system battery; and a circuit breaker controllable by a signal determining an excitation of the generator arranged between the electrical-system battery and the starter battery;

wherein the consumers specific to the vehicle electrical system are permanently assigned to the electrical-system battery, and the start-relevant consumers are permanently assigned to the starter battery;

comprising the steps of:

determining the excitation of the generator; and switching through the two electronic pole terminals and closing the circuit breaker after the determining step.

6. The method according to claim 5, further comprising the steps of:

prior to initiating a starting procedure, checking charges of the electrical-system battery and the starter battery by an electrical-system control unit; and switching through only the electronic pole terminal of the electrical-system battery when both the electrical-system battery and the starter battery are sufficiently charged.

7. The method according to claim 5, further comprising the steps of:

prior to initiating a starting procedure, checking charges of the electrical-system battery and the starter battery by an electrical-system control unit; and switching through only the electronic pole terminal of the starter battery when the starter battery is sufficiently charged and the electrical-system battery is insufficiently charged.

8. The method according to claim 5, wherein the two-battery system further includes an electrical-system control unit configured to control at least one of the circuit breaker and the electronic pole terminals, the method further comprising the steps of:

prior to initiating a starting procedure, checking charges of the electrical-system battery and the starter battery by the electrical-system control unit; and when the charge of the electrical-system battery is sufficient and the charge of the starter battery is insufficient, closing the circuit breaker by the-electrical-system control unit before the electronic pole terminal of the electrical-system battery is switched through.

9. The method according to claim 5, further comprising the step of switching through the first electronic pole terminal to perform an external start using an external battery.

* * * * *